Aug. 8, 1967     A. L. FACCOU     3,334,927
BALL PIPE JOINT
Filed Oct. 30, 1964     2 Sheets-Sheet 1
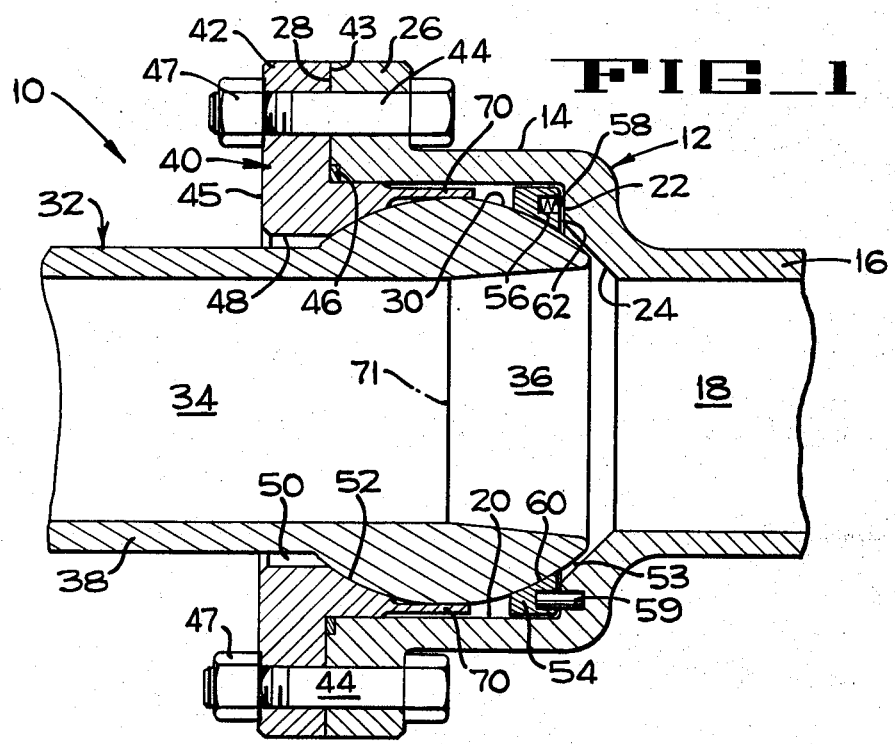
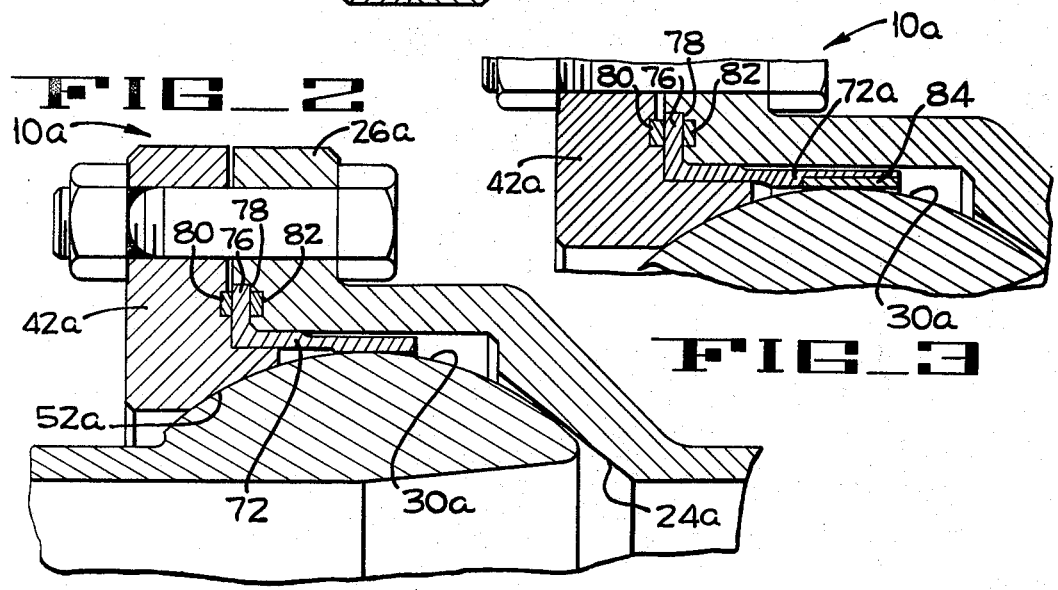
INVENTOR
ARMAND L. FACCOU
BY /Hans G. Hoffmeister/
ATTORNEY

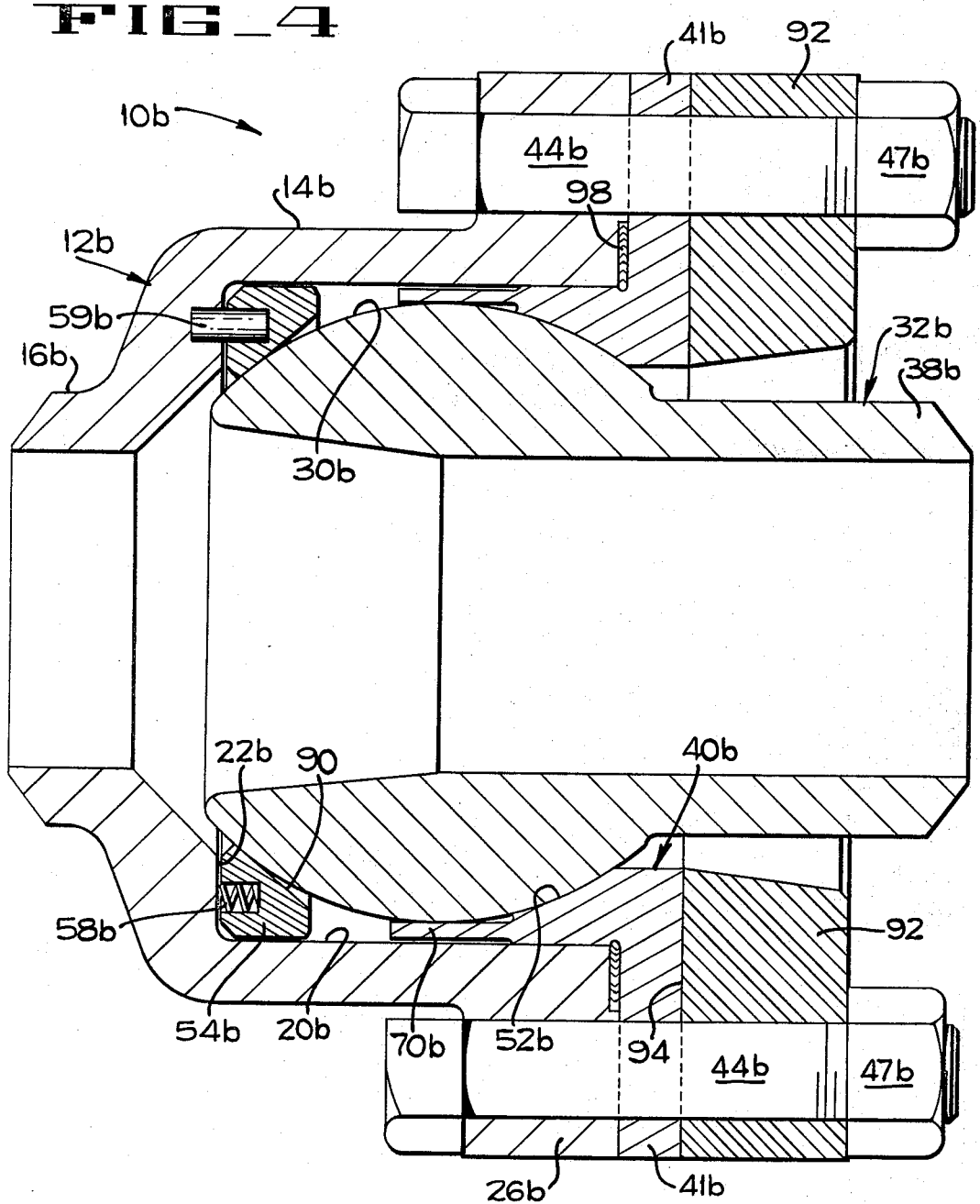

United States Patent Office 3,334,927
Patented Aug. 8, 1967

3,334,927
BALL PIPE JOINT
Armand L. Faccou, Santa Ana, Calif., assignor to FMC Corporation, San Jose, Calif., a corporation of Delaware
Filed Oct. 30, 1964, Ser. No. 407,650
5 Claims. (Cl. 285—110)

The present invention pertains to ball pipe joints for handling high temperature fluids at both negative and high positive pressures.

Certain pipe joints presently in use for high pressure and high temperature service require either very accurate machining or a very tight fit to effectively seal the joint. In turn, thermal expansion of the joint, due to this construction, can inhibit or even prevent axial or rotative movement of the relatively movable parts of the joint. Such expansion can also interfere with longitudinal thermal expansion of the conduits that are interconnected by the pipe joint.

The ball pipe joint of the present invention includes a novel metal sealing ring or skirt which does not depend upon precise axial orientation of the coupling members of the joint to effect an efficient fluid-tight seal. By virtue of this construction, longitudinal thermal expansion, or limited longitudinal movement of the flow line conduits interconnected by the ball pipe joint will not impair the sealing action.

An object of the present invention is to provide an improved ball pipe joint for handling high temperature fluids at both negative and high positive pressures.

Another object is to provide a ball pipe joint which can accommodate axial and diametric movements within the joint as a result of temperature changes or otherwise, without impairment of its sealing action.

Another object is to provide an all metal ball pipe joint which does not require extensive, close tolerance machining.

A further object is to provide a ball pipe joint employing combined dynamic and static seals which are entirely metal.

Other objects and advantages of the present invention will become apparent from the following description and accompanying drawings wherein:

FIGURE 1 is a longitudinal section through a ball pipe joint embodying the present invention.

FIGURE 2 is a fragmentary longitudinal section through a modified form of the ball pipe joint shown in FIGURE 1 and is drawn at a larger scale.

FIGURE 3 is a fragmentary section through a modified form of sealing ring which may be used with the ball pipe joint shown in FIGURE 2.

FIGURE 4 is a longitudinal section through still another embodiment of a ball pipe joint embodying the invention.

The ball pipe joint 10 shown in FIGURE 1 includes a hollow external coupling member 12 having a bell end 14 and a welding neck 16 (partly broken away) for attachment to a flow line conduit, not shown. A bore 18 of the coupling member 12 may conduct a high pressure and high temperature fluid, such as steam, in either direction.

The internal surfaces of the bell end 14 include a bore surface 20, a radial end wall surface 22, and a beveled wall surface 24 that merges with the bore 18 of the welding neck 16. The bell end 14 has an outwardly projecting radial bell flange 26 which is provided with a planar end face 28.

Mounted within the bell end 14 for relative rotation and limited axial misalignment therewith is a partially spherical end, knuckle or ball 30 of an internal coupling member 32 having a bore 34 which communicates with the bore 18. The bore 34 of the coupling member 32 has an outwardly flared portion 36 whereby in the usual manner, axial misalignment of the coupling member 32 does not impair fluid flow at the juncture of the bore 18 and the flared portion 36. An integral welding neck 38, partly broken away, is provided to attach the coupling member 32 to a flow line, not shown.

Rigidly attached to the bell flange 26 is a one-piece metal seal and bearing ring 40 which is provided with a radial mounting flange 42 having a planar inner end surface 43 and an outer end surface 45. The mounting flange 42 abuts and is substantially sealed to the end face 28 of the bell flange 26 by a plurality of bolts 44, which extend through both flanges 42 and 26, and nuts 47 on the bolts. The interface of the flanges 26 and 42 is provided with a deformable, wire-reinforced asbestos static sealing annulus 46 which is mounted in a groove formed in the bell end 14 and is compressed into intimate sealing engagement with both flanges when the nuts 47 on the bolts 44 are tightened.

The inner portion of the outer end surface 45 of the flange 42 merges with a circumferential wall 48 which defines an aperture 50 that circumscribes, and is slightly larger than, the welding neck 38 so as to provide clearance for axial misalignment of the coupling members 12 and 32. Wall 48 adjoins a concave, annular bearing surface 52 which has total surface engagement with the corresponding segment of the spherical end 30. An annular clearance space 53 between the beveled wall 24 and the spherical end 30 allows part of the fluid in the joint to flow into the bell end 14. The clearance space 53 also accommodates, under certain operating conditions later mentioned, limited axial movement of the two coupling members 12 and 32 relative to one another.

Cooperating with the concave bearing surface 52 is an axially movable circular bearing 54 which is mounted in the bell end 14 near the radial wall 22 and has a smaller outside diameter than the diameter of the bore 20 so that the bearing 54 is freely movable axially within the bore. That end surface of the bearing 54 which faces the radial wall 22 is provided with a plurality of recesses 56, only one of which is shown. Mounted in each recess is a compression spring 58 that urges the bearing 54 away from the radial wall 22 and into firm contact with the spherical end 30 of the coupling member 32. One, or more, of the recesses 56 is provided with a pin 59 that extends into a corresponding recess in the radial wall 22 so as to prevent rotation of the bearing 54 relative to the coupling member 12.

That surface of the bearing ring 54 which contacts the spherical end 30 is provided with a curved annular seat 60 which is in total surface engagement with the spherical end 30. The spherical end 30 of the coupling member 32 is thus mounted for limited universal axial misalignment within the coupling member 12 between the bearing surfaces 52 and 60 and for limited movement of the coupling members 12 and 32 toward and away from one another up to the limits of the clearance space at 62, between the bearing 54 and the radial wall 22, and the clearance space 53.

During such movement, as well as when the coupling members 10 and 12 are static, the spherical end 30 is substantially tangentially engaged in fluid-tight relation by the inner surface of a cylindrical, somewhat resiliently expandable, sealing skirt 70 that is an integral part of the seal and bearing ring 40. The radial dimension of the wall of the sealing skirt 70 is relatively small, and the internal diameter of the skirt, before the ball pipe joint 10 is assembled, is less than the diameter of the spherical end 30 as measured in a plane passing through the center 71 of said end 30. Accordingly, during assembly of the ball pipe joint 10, the sealing skirt 70 is diametrically expanded by, and is thus radially stressed to grip, the spherical end 30 with a predetermined force governed by the thickness of the sealing skirt 70, its flexure and material.

It will be noted that the exterior surface of the sealing skirt 70 lies inward of the bore surface 20. Because the axially movable bearing 54 is not sealed against the bore surface 20 or the adjacent radial wall surface 22, fluid within the joint is transmitted through the clearance spaces 53 and 62 beyond the bearing 54 and acts against the outer surface of the sealing skirt 70. The effectiveness of the sealing skirt 70 thus increases in proportion to any increase in hydrostatic pressure of the fluid.

The sealing skirt 70 effects a primary dynamic fluid seal with the spherical end 30, and the interface of the bearing surface 52 and the spherical end 30 provides a secondary dynamic seal. It will be seen, however, that any expansion of the conduits, or necks 16 and 38 to which such conduits are attached, which is sufficient to impair the secondary seal does not in any way disrupt the primary seal, regardless of the amount of such expansion and/or misalignment of the coupling members 12 and 32.

The embodiment of the ball pipe joint 10a (FIG. 2) provides a removable sealing skirt 72 which is suitable for use under certain operating conditions such as where entrained abrasives in the fluid might cause unusually rapid wear of the sealing skirt. The sealing skirt 72 is provided with an integral radial flange 76 which lies in a recess 78 of the flange 26a and is gripped between deformable metal sealing annuli 80 and 82 that are respectively mounted in grooves in the flanges 42a and 26a, so that the sealing skirt can be readily replaced when it is no longer effective. In other respects, the ball pipe joint 10a is constructed substantially the same as the ball pipe joint 10, except that the axially movable circular bearing 54 (FIG. 1) is omitted.

If the ball joint 10a handles relatively cool, high pressure fluid, thermal expansion of its associated flow line conduits, not shown, presents no problem and the fluid forces within the joint are sufficient to keep the spherical end 30a seated against the bearing surface 52a.

If the fluid being handled is relatively hot, the secondary seal which normally occurs along the interface of the concave recess 52a and the corresponding segment of the spherical end 30a may or may not be effective because the secondary seal depends upon the temperature of the fluid being insufficient to linearly expand the flow line conduits to the extent that the spherical end 30a is unseated from the bearing surface 52a.

While the ball pipe joints 10 and 10a are especially useful for handling hot fluids at high positive pressures, the joints 10 and 10a also have usefulness in vacuum applications because the sealing skirts 70 and 72 are resiliently diametrically expanded by their associated spherical ends 30 and 30a during assembly of the joints so that a predetermined sealing action is effected independent of positive or negative pressure fluid in the joint.

Either sealing skirt 70 or 72 (FIGS. 1 and 2) may be provided with an annular insert as shown at 84 in FIGURE 3 for the sealing skirt 72a. The insert 84 may be made of Teflon, nylon, or of a metal dissimilar to the metal comprising the spherical end 30a and the sealing skirt 72a. If constructed of metal, the wear insert 84 is preferably of a metal having a higher rate of thermal expansion than both the spherical end 30a and the sealing skirt 72a. By this construction there is little or no loss of the original diametric or hoop stress in the insert when the ball pipe joint 10 or 10a is handling hot fluid, and the sealing action is still effective for either negative or positive pressures.

The ball pipe joint 10b (FIG. 4) also embodies the novel axial sealing skirt, and is provided with additional features which make it particularly useful for working pressures as high as 2500 p.s.i. and temperatures as high as 670° F.

In a manner similar to the previously described embodiments of the invention, the ball pipe joint 10b comprises an internal coupling member 32b, having a partially spherical end 30b, which is disposed within a coupling member 12b having a bell end 14b. The coupling members 12b and 32b are provided with welding necks 16b and 38b, respectively, for installing the ball pipe joint in a flow line which may carry, for example, saturated steam at the aforesaid pressure and temperature.

A radial wall 22b merges with an internal surface defining a bore 20b of the bell end 14b. The radial wall 22b is provided with an aperture holding a locking pin 59b that extends into a corresponding recess in an adjacent circular bearing 54b. The bearing 54b carries a plurality of compression springs 58b in recesses therein, only one spring and recess being shown, which bear against the radial wall 22b and force the bearing axially into contact with the spherical end 30b. Contrary to the construction of the bearing 54 (FIG. 1), the bearing 54b has a planar, beveled internal wall 90 which effects substantially only line-surface contact with the spherical end 30b. Further, the bearing 54b is copper-plated to minimize galling in its region of sliding contact with the adjacent portion of the spherical end 30b.

The opposite portion of the spherical end 30b is seated with total surface contact against a concave annular bearing surface 52b in a combined seal and bearing ring 40b. Ring 40b is formed of aluminum-bronze alloy and has an integral radial flange 41b and a cylindrical skirt 70b which is diametrically outwardly stressed upon assembly of the ball pipe joint in the same manner described in connection with the ball pipe joint 10. Because the aluminum-bronze skirt 70b has a low coefficient of friction and is dissimilar from the metal of the coupling member 32b, relative rotation and/or misalignment of the coupling members is accomplished with little frictional resistance and with freedom from galling.

However, the radial flange 41b of the aluminum-bronze ring 40b is considered by certain regional construction codes and regulations to require reinforcement. Therefore, to avoid making the flange 41b excessively thick to safely withstand high working pressures (2500 p.s.i. for example) of the ball joint 10b, a steel backup annulus 92 is provided against the ring whereby the radial flange 41b is strongly reinforced to meet the stated code requirements and to prevent warpage or breakage of the seal and bearing ring 40b. The radial flange 41b and the backup annulus 92 are made to accept the mounting bolts 44b that extend through the bell flange 26b and lock the assembly together in cooperation with associated nuts 47b. Only the radial interface of the bell flange 26b with the radial flange 41b requires sealing against the loss of fluid from the ball pipe joint, and this sealing action is provided by a conventional wire-reinforced asbestos gasket 98 that is mounted in a groove in the bell flange 26b and is axially compressed when the nuts 47b are tightened.

It will be recognized that the ball pipe joint 10b can accommodate longitudinal thermal expansion of the conduits connected thereto in the same manner described in connection with the ball pipe joint 10, because the sealing action of the skirt 70b is undisturbed if relative axial movement does occur between the coupling members 12b and 32b. Further, galling of the interengaging relatively movable surfaces, and friction therebetween, is minimized by the particular materials and construction employed, whereby the ball pipe joint 10b has a long life, does not require frequent attention, and is especially suited for handling superheated steam or other hot fluids which may be of relatively low viscosity.

It will be seen that the ball pipe joints 10, 10a and 10b provide effective sealing actions without the attendant problems of pipe joints employing elastomeric, synthetic or organic sealing means which, at the present time, rapidly deteriorate and/or are ineffective above temperatures of about 400° to 500° F. Another important feature of the present invention is that the sealing actions of the sealing skirts 70, 72, 72a and 70b are effective regardless of usual thermal expansion of their associated ball joints, and regardless of axial displacement of their respective coupling members because the hoop stress in the sealing skirts maintains the sealing action even if the coupling members are subject to relative axial movement. Further, these improved results are achieved without requiring extensive and accurate machining, without using mechanical force that would seriously impair relative rotation of the coupling members, and without requiring any precise and tedious mechanical adjustments during assembly and operation of the ball pipe joints to achieve the desired functions of low turning torque and effective sealing action. Thus, by the particular constructions and arrangements of the sealing skirts 70, 72, 72a and 70b, and the spherical ends 30, 30a and 30b, liberal clearances can be provided within the ball pipe joints 10, 10b to accommodate relative axial movement of the coupling members. Inasmuch as the skirt sealing action is not dependent upon hydrostatic pressure within the ball pipe joints, although positive pressure does aid in the sealing action, very low pressures or negative pressures do not adversely affect operation of the joints.

Whereas ordinary ball joints have only one dynamic sealing area along the interface of the spherical end 30 (FIG. 1) and the bearing surface 52, the ball joint of the present invention normally has two dynamic sealing areas, i.e., along the interface of the sealing skirt 70 with the spherical end 30, and along the interface of the bearing surface 52 and the spherical end 30. Furthermore, in the ordinary ball joint, a gasket of particular thickness is employed between the radial flanges 26 and 42 so that the proper compression can be effected upon the spherical end 30 in order to obtain the proper balance between turning torque and leakage. It will be apparent that in the ball joint 10, the proper balance between turning torque and leakage requires no painstaking adjustment but is automatically effected due to the hoop stress in the sealing skirt 70.

It will be apparent that the particular details herein set forth may be modified or varied without departing from the principles of the invention, and that the scope of the invention should be limited only by the scope and proper interpretation of the claims appended hereto.

The invention having been described, that which is believed to be new, and for which protection by Letters Patent is desired, is:

1. A ball pipe joint comprising a first coupling member having a bell end, a second coupling member having a partially spherical end disposed within said bell end, a seal and bearing ring sealingly secured to said bell end and having an inner annular bearing surface in engagement with the adjacent portion of said spherical end to constitute a secondary dynamic seal, means urging said spherical end into sealing engagement with said bearing surface and a cylindrical sealing skirt carried with said seal and bearing ring, said sealing skirt having a cylindrical inner surface in tangential sealing engagement with said spherical end and being diametrically outwardly stressed by engagement of its inner surface with the major diameter portion of said spherical end to constitute a primary dynamic seal, said cylindrical inner surface of said sealing skirt having an axial length sufficient to allow said primary seal to remain intact notwithstanding interruption of said secondary seal upon axial movement of said coupling members.

2. A ball pipe joint according to claim 1 wherein said sealing skirt is removably clamped between said seal and bearing ring and the end surface of said bell end of said first coupling member for facilitating replacement of the sealing skirt.

3. A ball pipe according to claim 1 in which said cylindrical sealing skirt and said seal and bearing ring are unitary.

4. The ball pipe construction of claim 1 in which said cylindrical sealing skirt is provided with an internal annular wear insert which engages said spherical end.

5. The ball pipe construction of claim 1 wherein said seal and bearing ring is provided with a radially projecting flange mounted against the corresponding end surface of said bell end, and a backup annulus substantially coextensive with said radially projecting flange and rigidly clamped against said flange for reinforcement thereof.

References Cited

UNITED STATES PATENTS

| | | | |
|---|---|---|---|
| 541,164 | 6/1895 | Holland | 285—110 |
| 1,532,195 | 4/1925 | Morrison | 285—261 X |
| 1,580,462 | 4/1926 | Woodruff | 285—267 |
| 1,827,432 | 10/1931 | Hundemer | 285—269 X |
| 2,117,152 | 5/1938 | Crosti | 285—263 |
| 3,056,615 | 10/1962 | Breitenstein | 285—187 |
| 3,069,187 | 12/1962 | Collins et al. | 285—110 |

FOREIGN PATENTS

| | | |
|---|---|---|
| 659,510 | 3/1963 | Canada. |
| 885,949 | 8/1953 | Germany. |
| 686,387 | 1/1953 | Great Britain. |
| 892,352 | 5/1962 | Great Britain. |

CARL W. TOMLIN, *Primary Examiner.*

D. W. AROLA, *Assistant Examiner.*